Figure 1:
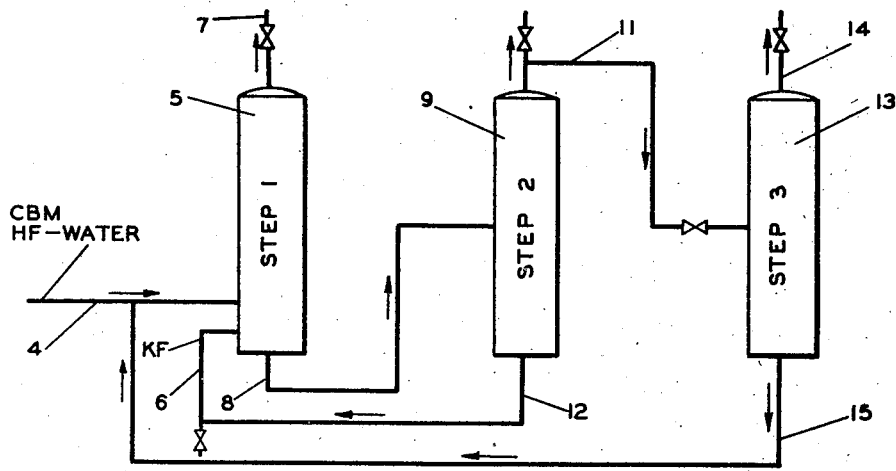

Oct. 7, 1947.   M. P. MATUSZAK   2,428,524
RESOLUTION OF AQUEOUS HYDROFLUORIC ACID
Filed Oct. 10, 1946   2 Sheets-Sheet 1

INVENTOR.
M.P. MATUSZAK
BY Hudson and Young
ATTORNEYS

Patented Oct. 7, 1947

2,428,524

UNITED STATES PATENT OFFICE 2,428,524

RESOLUTION OF AQUEOUS HYDROFLUORIC ACID

Maryan P. Matuszak, Bartlesville, Okla., assignor to Phillips Petroleum Company, a corporation of Delaware Application October 10, 1946, Serial No. 702,453

16 Claims. (Cl. 260—683.4)

1

This invention relates to the treatment of hydrogen fluoride solutions. In one embodiment this invention relates to the recovery of anhydrous hydrogen fluoride from an azeotropic mixture with water. In another aspect this invention relates to a hydrocarbon conversion process using hydrogen fluoride as a catalyst. In still another aspect this invention relates to the purification of a hydrofluoric acid catalyst used in a hydrocarbon conversion process.

The value of anhydrous hydrofluoric acid as a hydrocarbon conversion catalyst is recognized by those familiar with the art. This acid is used to catalyze such reactions as alkylation, isomerization, and disproportionation. In these processes it is desirable to maintain the titratable acidity of the catalyst at about 75 to 100 per cent. For this purpose, in commercial practice, part of the used acid is withdrawn from the conversion system and distilled to separate substantially pure hydrofluoric acid from the diluents that accumulate during the conversion. The chief diluents are water and a relatively high-boiling, unsaturated, acid-soluble oil. When the used acid is distilled, usually in a series of distillation steps, substantially anhydrous hydrofluoric acid is obtained as an overhead fraction, which is recycled to the hydrocarbon conversion system; acid-soluble oil is obtained as a kettle residue; and the water is withdrawn from the distillation in an intermediate fraction comprising a maximum-boiling azeotropic mixture of water and hydrofluoric acid. At atmospheric pressure this azeotropic mixture boils at about 120° C. and contains about 38 weight per cent hydrofluoric acid. Since the separation of anhydrous hydrofluoric acid from the azeotropic mixture is difficult, this intermediate fraction is frequently discarded and, consequently, considerable quantities of hydrofluoric acid are lost.

Since in commercial processes for the conversion of hydrocarbons the loss of hydrogen fluoride is significant, a method for substantially complete recovery of highly concentrated or anhydrous hydrogen fluoride is much to be desired. Furthermore, certain concentrations of hydrogen fluoride and water are very corrosive to various types of construction material. As a result of such corrosiveness, a method to control and to minimize the percentatge of water in the hydrogen fluoride catalyst throughout a conversion system would simplify the construction of process equipment. In this respect, copper and Monel metal and a few other metals can be used over a relatively large range of concentrations of water in the hydrogen fluoride catalyst; however, if the concentration of water could be maintained less than about 20 per cent throughout the process use of steel and cast iron would be possible.

The object of this invention is to recover con-

2 centrated hydrogen fluoride from admixture with other materials.

Another object of this invention is to recover concentrated or anhydrous hydrogen fluoride from an azeotropic mixture of hydrogen fluoride and water.

Still another object is to recover substantially anhydrous hydrogen fluoride from an admixture of hydrogen fluoride and hydrocarbons.

Another object is to maintain substantially water-free hydrogen fluoride having a non-corrosive effect on steel and cast iron in hydrocarbon conversion processes.

Another object is to decrease the cost of hydrogen fluoride recovery and make-up in hydrocarbon conversion processes.

Another object is to provide a novel process for the alkylation of low-boiling isoparaffins, such as isobutane, with olefins in the presence of hydrogen fluoride as a catalyst.

Other objects and advantages of the present invention will become apparent to those skilled in the art from the accompanying disclosure and description.

This invention is based in part on the unexpected and surprising discovery that the normal relationship between the vapor pressures of water and of hydrofluoric acid is reversed by the presence of more than a critical concentration of one or more alkali metal fluorides. As is well known, the vapor pressure of hydrofluoric acid, which boils at approximately 19.4° C., is normally greater than that of water, which boils at 100° C. I have found that in a liquid, solution of water or acid with at least one alkali metal fluoride, this normal relationship prevails only so long as the salt concentration is below a critical value, which depends somewhat upon the particular salt or salts and upon the particular temperature of the solution. At this critical salt concentration, the vapor pressures are equal for the water-salt solution and the hydrofluoric acid-salt solution. Above this critical salt concentration, the vapor pressure of the water solution exceeds that of the hydrofluoric acid solution, and the difference in vapor pressures increases progressively with increase in the salt concentration, so that at sufficiently high concentration the two solutions have boiling temperatures as far apart as those of the pure solvents themselves, or even farther apart, though in the opposite direction.

In one specific embodiment, this invention produces anhydrous hydrofluoric acid from the aqueous azeotrope or constant boiling mixture (CBM) by a series of three distillation and/or heating steps, which are schematically indicated in Figure 1 of the accompanying drawings.

A constant boiling solution of hydrogen fluoride and water, generally containing between about 30 and about 40 weight per cent hydrogen fluoride, is introduced into distillation column 5 of step 1 by means of conduit 4. Molten potassium fluoride is introduced into column 5 by means of conduit 6 in an amount such that potassium fluoride is dissolved in the kettle liquid in the lower portion of column 5 in an amount between about 35 and about 45 mol per cent. Water substantially free from hydrogen fluoride is withdrawn from column 5 through outlet conduit 7 as an overhead product. A bottom product comprising a liquid solution of potassium fluoride, hydrogen fluoride and water is removed from column 5 through outlet conduit 8 and is passed to stripping column 9 of step 2 in which column hydrogen fluoride is stripped from the bottom product of column 5 of step 1. A partially stripped liquid bottom product is removed from stripping column 9 through outlet conduit 12 and returned to column 5 of step 1 through conduits 6 and 12. An overhead fraction from column 9, which may comprise not only hydrogen fluoride but in some instances substantial portions of water, is removed from the process through conduit 11 and, when water is present, may be passed to a third distillation step. When a third distillation is desired, the overhead product of column 9 is passed to distillation column 13 of step 3 through conduit 11. A bottom product is removed from column 13 comprising an azeotropic mixture of hydrogen fluoride and water and is recycled to conduit 4 through conduit 15. An overhead product from column 13 comprising substantially anhydrous hydrogen fluoride is removed therefrom through outlet conduit 14 as a product of the process.

In all stages of this embodiment, the conditions are preferably such that the alkali metal fluoride in the system is substantially completely in liquid phase, or in liquid solution. Consequently, at least one alkali metal fluoride is preferably at least as heavy molecularly as potassium fluoride, inasmuch as the alkali metal fluorides increase progressively in solubility with increase in molecular weight, as is indicated by the following data of Table I for the solubility in water at 18° C.

Table I

| Salt | Mol. Wt. | Solubility, g./100 ml. |
|---|---|---|
| LiF | 25.94 | 0.27 |
| NaF | 42 | 4.05 |
| KF | 58.1 | 48.0 |
| RbF | 104.45 | 56.7 |
| CsF | 151.8 | 78.6 |

Analogously, the alkali metal fluorides increase progressively in solubility in hydrofluoric acid with increase in molecular weight, as may be judged from the following available approximate data of Table II for the melting point of several acid fluorides or hydrofluorides (or "hydrofluorates") of alkali metal fluorides.

Table II

| Salt | M. P., °C. | Salt | M. P., °C. | Salt | M. P., °C. |
|---|---|---|---|---|---|
| KF·HF | 239 | KF·2HF | 71.5 | KF·3HF | 65 |
| RbF·HF | 205 | Rb·2HF | 51.7 | Rb·3HF | 45 |
| CsF·HF | 142 | CsF·2HF | 19 | CsF·3HF | |

Although, from the point of view of solubility in water and in hydrofluoric acid, cesium fluoride may appear to be the most desirable alkali metal fluoride for use in the process of this invention, it is found in practice that potassium fluoride is operatively adequately soluble. Indeed, potassium fluoride is exceptionally soluble, resembling in solubility behavior relatively much more closely the heavier alkali metal fluorides than the lighter ones. Consequently, and additionally because of its relative availability at low cost, potassium fluoride is usually selected for most applications of this embodiment of this invention, in preference to rubidium fluoride and/or cesium fluoride. Nevertheless, inasmuch as the two heavier alkali metal fluorides are somewhat compensatorily advantageous in that they can be maintained in liquid hydrofluoric acid phase at relatively lower temperature or at relatively lower concentration of hydrofluoric acid, one or both of them may be appropriately selected for many particular applications. Also, in some applications, either or both of them can be advantageously used together with one or more lighter alkali metal fluorides in such proportions that the mixture of resulting acid fluorides has an exceptionally low freezing point, which may be as low as that of a eutectic mixture.

From another point of view, potassium fluoride is relatively the most advantageous sole alkali metal fluoride because it has the optimum stability in combination with hydrofluoric acid. This stability changes progressively among the various alkali metal fluorides, as is indicated, for example, by J. W. Mellor, "The stability of the alkali monohydrogen fluorides decreases in passing from sodium to cesium" ("A Comprehensive Treatise on Inorganic and Theoretical Chemistry," volume II, page 517). Unexpectedly, however, and contrary to the apparently generally held view indicated in the statement just quoted, I have found that the stability of the alkali metal acid fluorides increases rather than decreases with increase in the atomic weight of the alkali metal. That is, the vapor pressure of hydrofluoric acid from an alkali metal acid fluoride decreases progressively with increase in the atomic weight of the alkali metal. For example, in the temperature range of interest of the present process, the vapor pressure of hydrofluoric acid from the monohydrofluoride of sodium fluoride exceeds considerably that from the monohydrofluoride of potassium fluoride; and conversely, the latter exceeds that from the monohydrofluoride of rubidium fluoride or of cesium fluoride. It appears that, for most applications in facilitating the removal of water by fractional distillation in step 1, sodium fluoride is of relatively low effectiveness in preferentially decreasing the vapor pressure of hydrofluoric acid, and rubidium fluoride and cesium fluoride are of relatively somewhat excessive effectiveness, so that potassium fluoride is usually the optimum alkali metal fluoride from this point of view.

Nevertheless, within the broad scope of this invention, sodium fluoride, or even lithium fluoride, may be utilized, especially when a heavier alkali metal fluoride is present in adequate proportion to meet the process requirements for solubility and satisfactory average or over-all relative stability of the various possible combinations with hydrofluoric acid. For example, one mixture that appears advantageous is approximately 23.94 mol percent sodium fluoride and 76.06 mol percent potassium fluoride, inasmuch as the corresponding monohydrofluorides have a eutectic point as low as approximately 175° C. Another mixture that for some applications may be advantageous is of approximately 11.5 mol percent sodium fluoride, 42 mol percent potassium fluoride, and 46.5 mol percent lithium fluoride; this mixture has a eutectic triple point as low as approximately 454° C.

Figure 2:
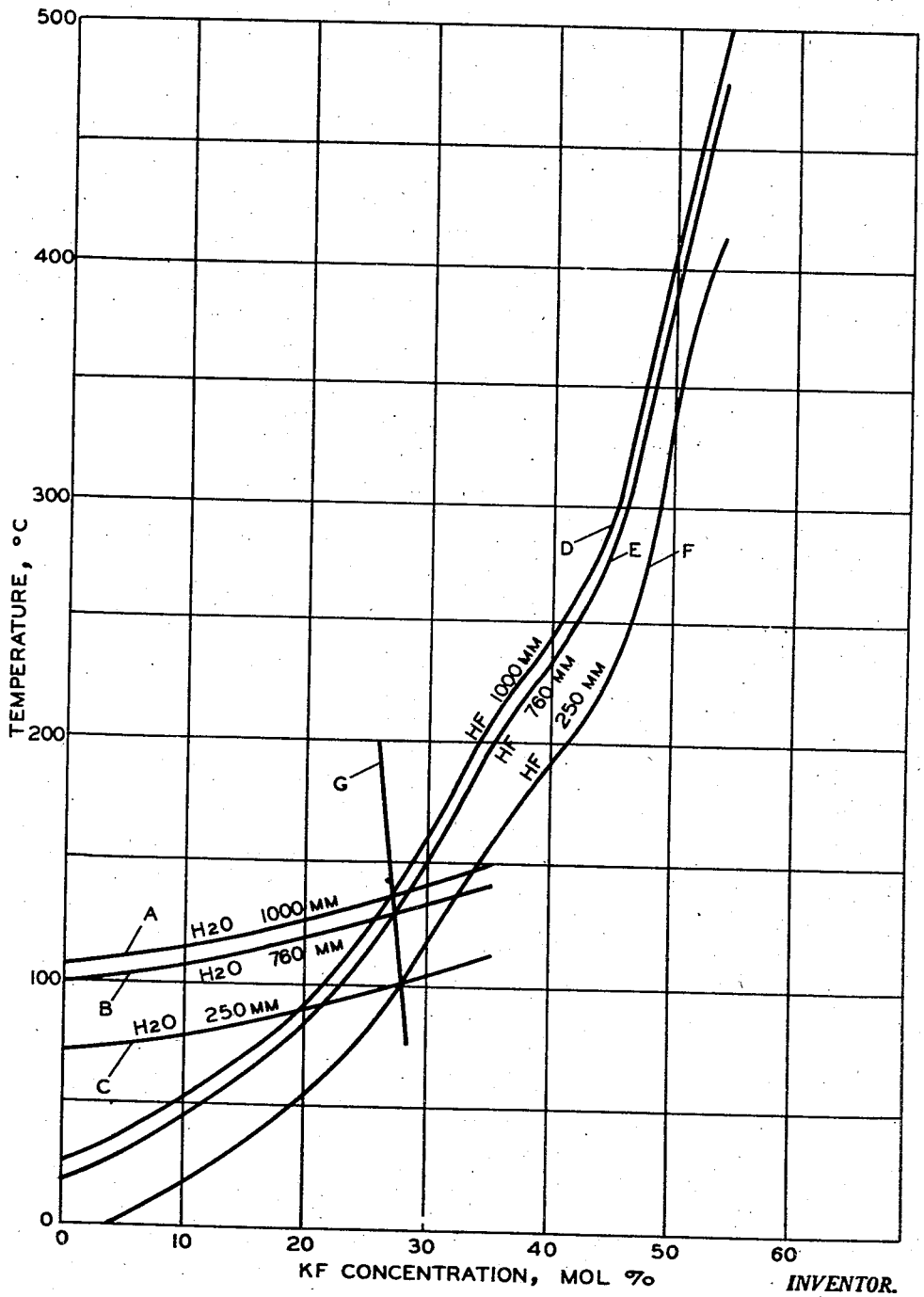

To facilitate understanding of the vapor pressure relationships pertinent to step 1, there are presented in Figure 2 of the drawing some illustrative isobaric boiling curves based on vapor pressure data for solutions of potassium fluoride in water and in hydrofluoric acid, giving the approximate boiling temperature at pressures of 250, 760, and 1,000 mm. of mercury. Inasmuch as the potassium fluoride concentration is in mol percent for each solution, the curves for the water-salt solution are directly comparable with those for the hydrofluoric acid-salt solution.

These curves illustrate the relationship between dissolved potassium fluoride and the boiling temperature of water and of hydrofluoric acid at constant vapor pressure. Each of these solvents increases in boiling temperature, or decreases in vapor pressure, progressively with increase in concentration of potassium fluoride. However, the rate of increase of boiling temperature with increase in salt concentration is markedly much greater for hydrofluoric acid than for water; consequently, when salt concentration is increased, the hydrofluoric acid solution approaches the water solution in boiling temperature, or in vapor pressure, until the two solutions are identical in this respect. Beyond this point of identical vapor pressure, the two solutions diverge, with the hydrofluoric acid solution retaining its characteristic of increasing in boiling temperature with increase in potassium fluoride concentration much more rapidly than the water solution; in consequence, the vapor pressure of the water solution becomes progressively larger than that of the hydrofluoric acid solution. As is indicated by the almost vertical and substantially straight line G passing through the intersections of the three pairs of isobars, namely curves A, B and C for the water-salt solution and curves D, E and F for the hydrofluoric acid-salt solution, the salt concentration at which the advantageous phenomenon of reversal of relative vapor pressure occurs depends somewhat on the temperature or the vapor pressure involved, being approximately 27 mol percent at 1,000 mm. and almost 1 mol percent higher at 250 mm. Line G may be taken as representing the approximate critical potassium fluoride concentration above which the vapor pressure of water exceeds the vapor pressure of hydrofluoric acid. Substantially similar lines represent the critical over-all salt concentration when part or all of the potassium fluoride is replaced by one or more other alkali metal fluorides, such as, for example, rubidium fluoride and/or cesium fluoride, whose acid salts resemble those of potassium fluoride.

In practice, wherein water and hydrofluoric acid are present in step 1 as a single solution rather than as two separate, distinct solutions, some slight modification of the indicated vapor pressure interrelationships and of the indicated critical salt concentration may be appropriate in view of the interactions of the two solvents with each other. Moreover, this critical concentration differs somewhat in correspondence with the particular alkali metal fluoride that is present, inasmuch as the acid salts or solutions of the various alkali metal fluorides or mixtures of such fluorides differ somewhat in boiling temperature or in vapor pressure of hydrofluoric acid. Nevertheless, the boiling-temperature curves A, B, C, D, E and F of Figure 2, although approximate only, serve as a helpful guide, particularly inasmuch as they indicate clearly that the desired preferential distillation of water in step 1 is favored by the following two factors, the first of which is relatively the more important: (1) increase in salt concentration, and (2) increase in distillation temperature. Consequently, it is advantageous to maintain the salt concentration in the kettle material of step 1 at a relatively high value, though preferably somewhat below that at which extensive precipitation or freezing might occur on slight cooling, and to conduct the fractional distillation at superatmospheric pressure in preference to subatmospheric pressure; however, any values of salt concentration and of distillation temperature or pressure that are satisfactorily operative may be utilized without going beyond the broad scope of this invention.

In order to minimize the possibility of freezing or solid-precipitation when the salt is potassium fluoride, the temperature of the solution in step 1 should generally be above approximately 75° C., which is approximately 3° C. above the highest melting point of any polyhydrofluoride of potassium fluoride. Usually, however, there is little danger of solid precipitation because the solutions tend to undergo supercooling. In practice, moreover, this temperature is usually well above 100° C., in order for the vapor pressure of the solution to exceed one atmosphere. Although this temperature may be as high as 300° C., or even higher, it is usually preferably maintained below approximately 225° C. in order to avoid any considerable decrease in the hydrofluoric acid content of the solution through vaporization. From inspection of Figure 2, it may appear that this temperature most preferably might be in the range of approximately 140 to about 160° C., since the middle temperature of this range, 150° C., is the approximate freezing point of a 40 mol per cent solution of potassium fluoride in hydrofluoric acid, at which temperature this solution has a vapor pressure of only approximately 70 mm. whereas the corresponding solution of salt in water has a vapor pressure of approximately 800 mm. In practice, however, because of thermal lag attending noticeable "supersaturation," the kettle temperature in step 1 is most preferably maintained in the somewhat higher range of approximately 150 to 200° C., such as 175° C., when the distillation is conducted at approximately atmospheric pressure.

Figure 3:
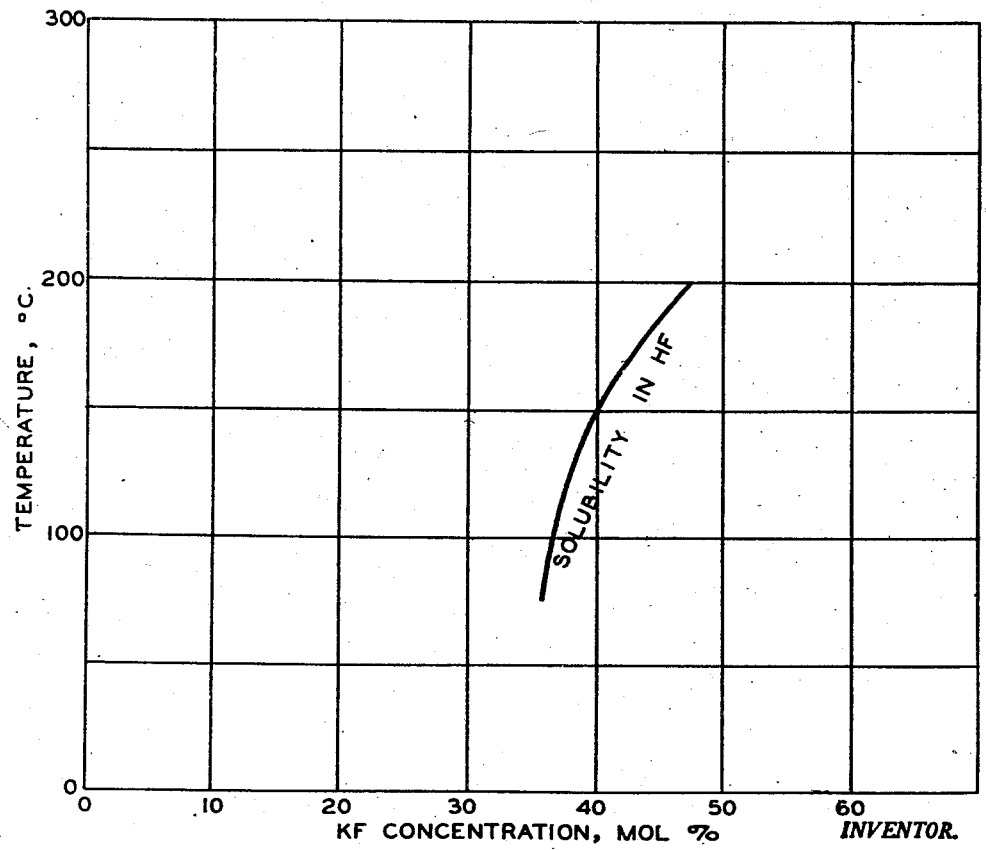

To assist in understanding the role of the potassium fluoride concentration in step 1, there is presented in Figure 3 a curve giving the approximate solubility of this salt in hydrofluoric acid for the temperature range from 75 to 200° C. This curve may be taken as representing roughly the preferred upper limit for the potassium fluoride concentration on a water-free basis. Although a lower limit is not essential, inasmuch as any concentration above zero produces some advantage, a useful lower limit for this salt concentration is the above-described critical concentration, at which the vapor pressures of solutions of equal molecular concentration in water and in hydrofluoric acid are equal. It may be noted that at 175° C. the range of potassium fluoride concentration thus delineated on a water-free basis is approximately from 26 to 43 mol per cent, with the range being somewhat smaller at lower temperatures and larger at higher temperatures. As has already been indicated, the preferential distillation of water in step 1 is facilitated by a relatively high salt concentration; consequently, a potassium fluoride concentration on the water-free basis in the range of approximately 30 to about 45 is appropriate, and a range between about 35 and about 40 mol per cent is preferred. It may be noted from Figure 2 that at 35 mol per cent of potassium fluoride the boiling temperature of the hydrofluoric acid-salt solution at 1000 mm. (curve D) is approximately 60° C. higher than the corresponding boiling temperature of the water-salt solution (curve A); even at 30 mol per cent of potassium fluoride and at 760 mm. (curves B and E) the effective difference in boiling point is as much as approximately 18° C. If an excess of the salt is present, it can be readily brought into solution by increasing the temperature somewhat. Although the presence of water has some effect on the solubility of the salt, it does not necessitate extensive modification of the ranges indicated.

The salt concentration is expressed in mol per cent on a water-free basis primarily for the sake of simplicity, inasmuch as the water content of the solution is different at different stages of the process. However, when the water content of the solution at a particular stage of the process is known, the salt concentration can be readily expressed in other units. For example, the range of 26 to 43 mol per cent for potassium fluoride concentration on a water-free basis corresponds to approximately 27 to 45 weight per cent of the total mixture when the hydrofluoric acid and the water are related to each other as in the azeotrope containing approximately 37 weight per cent hydrofluoric acid, as at the beginning of the treatment provided by the process.

Inasmuch as some hydrofluoric acid is volatilized from the solution in step 1, the fractional distillation in this step is preferably so conducted that the volatilized hydrofluoric acid is refluxed back to the kettle as an aqueous solution approaching the azeotropic composition for the temperature and pressure prevailing in the column proper. In other words, the fractional distillation in the column proper, above the kettle, is substantially similar to that which is well understood for separating a weaker-than-azeotropic hydrofluoric acid solution into water and the maximum-boiling azeotropic mixture, which contains approximately 35 to 40 per cent hydrofluoric acid by weight, depending upon the pressure. The water thus separated is withdrawn overhead. The kettle material is maintained in a boiling condition until the composition of its vapor approaches or approximates that of the returned reflux liquid, whereupon it is passed to step 2. Continuous operation of step 1 is usually preferred to batch operation, especially when the amount of aqueous hydrofluoric acid to be resolved is large.

In step 2, the kettle product from step 1 is subjected to partial, incomplete stripping at relatively elevated temperature, whereby a substantial fraction of the hydrofluoric acid, accompanied by substantially all residual water, is expelled. If desired, this expelled material may be withdrawn as a concentrated hydrofluoric acid, but ordinarily it is passed to step 3. For production of this expelled material at atmospheric or superatmospheric pressure, the final temperature should exceed approximately 425° C., and it may be as high as 550° C. or more. However, lower temperatures, even so low as approximately 300° C., can be used, if desired, provided that the expelled material is removed at an appropriate subatmospheric pressure or with the aid of an inert stripping or carrier gas, such as dry nitrogen, air, or low-boiling paraffin.

In step 3 the expelled hydrofluoric acid from step 2 is subjected to fractional distillation so conducted that any water present is refluxed back to the kettle as a solution approaching the azeotropic composition for the temperature and pressure prevailing in the column. In other words, this fractional distillation is substantially similar to that which is well understood for separating a stronger-than-azeotropic hydrofluoric acid solution into anhydrous hydrofluoric acid and the maximum-boiling azeotropic mixture. The hydrofluoric acid thus separated is withdrawn overhead as a desired product of the process, and the residual azeotropic mixture is passed to step 1 for retreatment.

The partially stripped potassium fluoride melt or solution obtained in step 2 is passed to step 1 for re-use in the process. Its composition may vary somewhat and depends on the exact stripping or decomposition conditions to which it has been subjected, but in general the melt or solution usually contains more than approximately 50 mol per cent of potassium fluoride, the remainder being substantially entirely hydrofluoric acid. Some care may be desirable to maintain this material in molten condition, for easy transfer to step 1. Because of its high temperature, it advantageously supplies heat required for the vaporization and fractional distillation in step 1.

In one advantageous modification, the stripping operation of step 2 is effected in two stages, which may be carried out successively in one stripping column, or, in continuous operation, may be preferably carried out in two successive stripping columns. In the first stage, the kettle product from step 1 is stripped substantially only to the extent that substantially all of the water is removed; in this stage, the final temperature may be, for example, in the range of approximately 300 to 350° C. The resulting slightly aqueous hydrofluoric acid is passed to step 3 for concentration as has been described. The residual kettle is further heated in the second stage, so that the final temperature is in the range of approximately 425 to 550° C., whereby substantially anhydrous hydrofluoric acid is obtained directly without subsequent concentration in step 3. Similarly, if desired, more than two stages may be employed, each effecting stripping to only a desired extent.

In another somewhat advantageous modification, step 3 is eliminated altogether. Steps 1 and 2 are then operated at such temperatures that the hydrofluoric acid obtained from step 2 is of a desired high concentration. For example, step 1 may be operated with a kettle temperature of approximately 200 to 300° C., and step 2 with a final temperature of approximately 425 to 550° C. Thereby concentrated hydrofluoric acid of approximately the same water content as that present in commercially available so-called anhydrous hydrofluoric acid is obtained directly from step 2. In this modification, it is usually preferable to employ relatively somewhat higher salt concentrations in the kettle material in step 1, such as, for example, potassium fluoride concentrations in the range of approximately 40 to 45 mol per cent on the water-free basis.

It will be understood that the flow-diagram in Figure 1 of the drawing is schematic only and does not indicate various pieces of equipment, such as heating means, cooling means, heat-exchange means, pumps, valves, automatic recorders and controllers, and the like, which, being well-known in both theory and practice, can be readily supplied and utilized wherever necessary or desirable. Also, it will be understood that various modifications and variations other than those specifically indicated herein will be obvious to those skilled in the art and may be employed without passing beyond the scope of this invention.

The following examples are offered as merely exemplary of the present invention and should not be construed to unduly limit the invention.

EXAMPLE I

A mixture of 45 grams of potassium fluoride, and 84.2 grams of 39 per cent hydrofluoric acid was subjected to simple or one-plate distillation at barometric pressure in an electrically heated monel distilling flask. The distillate was collected in successive fractions in monel bombs, and the fractions were analyzed for hydrofluoric acid by weighing and titration with standard alkali. The temperature of the vapor at the vapor takeoff leading to the condenser and the receiving bomb was measured with a thermocouple; the temperature of the flask itself or of the vapor within the flask proper was not measured, but it may be estimated to have been approximately 500° C. at the end of the distillation. The data are summarized in the following tabulation in Table III.

*Table III*

| Fraction | Vapor Temp., °C. | HF Concentration, Wt. % | Cumulative $H_2O$, % of $H_2O$ Taken | Cumulative HF, % of HF Taken |
|---|---|---|---|---|
| 1 | 90–100 | 39 | 1 | 1 |
| 2 | 100–109 | 15.1 | 48 | 14 |
| 3 | 109–108 | 18.2 | 95 | 30 |
| 4 | 108–100 | 61.6 | 98 | 41 |
| 5 | 100–60 | 86.2 | 100 | 66 |
| Residue | | | | 100 |

It may be noted that, with the exception of Fraction 1, which was exceedingly small and which is thought to represent withdrawal of vapor before mixing of the acid with the salt had occurred, the early fractions were relatively acid-poor, indicating that substantially acid-free water can be readily obtained by fractional distillation, which would be much more efficient than the simple distillation actually used. Also, it may be noted that the late fractions were acid-rich, having hydrofluoric acid concentrations far in excess of that in the aqueous azeotrope, indicating that substantially anhydrous hydrofluoric acid can be readily obtained by use of fractional distillation.

EXAMPLE II

A mixture of 58.1 grams of potassium fluoride, 63.4 grams of water, and 37.2 grams of hydrofluoric acid was subjected to distillation at barometric pressure (744–748 mm.) in the electrically heated monel distilling flask used in Example I, after the flask had been improved by filling the ¾-inch I. D. neck, up to approximately ¼-inch below the vapor takeoff, with twelve twisted $\frac{3}{16}$-inch copper strips approximately 8 inches long, which served as a crude column packing. By air-cooling the upper end of the neck of the flask, an unmeasured amount of refluxing was obtained, so that the distillation approached fractional distillation in character, with the equivalent of possibly one plate being provided by the copper-strip-packed neck of the flask. The flask was further improved by being provided with an external brazed-on thermocouple for measuring the temperature of the kettle. The distillate was collected in successive fractions in monel bombs, and the fractions were analyzed for hydrofluoric acid by weighing and titration with standard alkali. The data obtained are summarized in the following tabulation in Table IV.

*Table IV*

| Fraction | Temperature, °C. Head | Temperature, °C. Kettle | HF Concentration, Wt. % | Cumulative $H_2O$, % of $H_2O$ Taken | Cumulative HF, % of HF Taken |
|---|---|---|---|---|---|
| 1 | 100 | 136–142 | 0.40 | 19.1 | 0.1 |
| 2 | 100 | 144 | 0.72 | 29.2 | 0.3 |
| 3 | 100 | 153 | 0.93 | 39.2 | 0.4 |
| 4 | 100 | 160 | 0.89 | 47.8 | 0.6 |
| 5 | 100 | 168 | 0.94 | 54.5 | 0.7 |
| 6 | 100 | 181 | 1.40 | 63.1 | 0.9 |
| 7 | 100 | 219 | 1.11 | 69.3 | 1.0 |
| 8 | 101 | 199 | 1.45 | 75.2 | 1.1 |
| 9 | 100 | 208 | 1.56 | 80.0 | 1.3 |
| 10 | 104 | 264 | 31.9 | 98.6 | 16.2 |
| 11 | 72 | 322 | 89.8 | 99.6 | 30.9 |
| 12 | 66–62 | 331 | 91.8 | 99.8 | 34.6 |
| 13 | 63 | 430 | 95.2 | 100 | 42.8 |
| Residue | | | | | 100.0 |

The general pattern of these data is the same as that established in Example I but is considerably more clear-cut because of the improved character of the distillation. It may be noted that, in spite of the crude apparatus used, 80 per cent of the water was distilled off by the time that only 1.3 per cent of the hydrofluoric acid had passed overhead, and that substantially all of the water was distilled off by the time that roughly a third of the hydrofluoric acid had passed overhead. It is clear that, by fractional distillation in a column of several plates, substantially complete separation of the water and the hydrofluoric acid can be readily effected. On further heating of the residue, up to a kettle temperature of approximately 530° C., substantially anhydrous hydrofluoric acid was obtained, bringing the cumulative recovered hydrofluoric acid to approximately 77 per cent.

The results of Examples I and II, although obtained with relatively little material and with relatively crude apparatus, demonstrate effectively successful resolution of azeotropic aqueous hydrofluoric acid by the process of this invention, applied in a batch manner.

EXAMPLE III

In a continuous manner of operating the process of this invention, azeotropic aqueous hydrofluoric acid is passed into the kettle or onto the lowest tray of a first fractional-distillation column, in the kettle of which it is subjected to the action of dissolved potassium fluoride at the concentration of approximately 35 to 40 mol per cent on a water-free basis. When aqueous hydrofluoric acid more dilute than the constant-boiling azeotrope is to be treated, it is introduced onto the appropriate tray of the column that has approximately the same composition for the liquid thereon. The fractional-distillation column is operated at an average kettle temperature of approximately 150 to 210° C. and a corresponding slightly superatmospheric pressure. Substantially acid-free water is withdrawn overhead, and volatilized hydrofluoric acid along with water is refluxed back to the kettle, whereby the reflux liquid reaching the kettle has approximately the composition of the azeotrope under the prevailing conditions. From the bottom of the kettle, which preferably may be so heated as to have a temperature slightly above the average kettle temperature, is taken a kettle product in liquid phase, which is passed to a stripping column; it contains some water, as well as much hydrofluoric acid, in consequence of which it is capable of approaching substantial equilibrium with the vapor of the hydrofluoric acid-water azeotrope under the prevailing conditions. In the stripping column this material is heated to a temperature of 425 to 550° C.; the resulting liberated hydrofluoric acid, together with some liberated water, is passed to a second fractional-distillation column. If desired, this stripping operation may be effected in two stages, in the first of which the material is heated to approximately 300 to 350° C. to liberate substantially all the water, as well as relatively more hydrofluoric acid, which is passed to the second fractional-distillation column; and in the second of which the residual material is heated to approximately 425 to 550° C. to liberate substantially anhydrous hydrofluoric acid which is withdrawn as such. The residual, partly stripped material is returned in molten condition to the kettle of the first fractional-distillation column, whereto it supplies sensible heat because of its high temperature and latent heat because of participation in hydrofluorination and/or polyhydrofluorination. In the second fractional-distillation column, the liberated hydrofluoric acid is concentrated to anhydrous hydrofluoric acid, which is withdrawn overhead as the desired product of the process; the kettle product has an azeotropic composition and is passed to the first fractional-distillation column for retreatment. Instead of tray columns, suitably packed columns can be used.

EXAMPLE IV

The process is carried out substantially as in any of the preceding examples with rubidium fluoride and/or cesium fluoride instead of potassium fluoride, and with correspondingly necessitated changes in conditions, which may be readily determined by trial for any particular combination of circumstances.

EXAMPLE V

The process is carried out substantially as in any of the preceding examples with a mixture of alkali-metal fluorides, comprising sodium fluoride, in such proportions that the corresponding monohydrofluorides form a low-melting mixture approaching the corresponding eutectic mixture in composition.

It is believed sufficient discussion of the theory and operation of this invention has been presented to enable those skilled in the art to adequately understand the invention, and various alterations and modifications of this invention may become apparent to those skilled in the art without departing from the scope of this invention.

I claim:

1. In the alkylation of isobutane in the presence of a hydrofluoric acid alkylation catalyst in which used hydrofluoric acid is purified by distillation under conditions such that an azeotropic mixture of water and hydrofluoric acid is formed, the method for recovery of more concentrated hydrofluoric acid from said azeotropic mixture which comprises in a first step distilling such as azeotropic mixture in the presence of potassium fluoride dissolved in the kettle liquid in an amount between about 30 and about 45 mol per cent at a kettle temperature between about 75 and about 300° C. and a corresponding pressure, removing from said distillation an overhead product comprising water substantially free from hydrogen fluoride and a liquid bottom product comprising potassium fluoride and hydrogen fluoride, in a second step stripping said bottom product from said first distillation at a temperature between about 300 and about 550° C. and a suitable pressure such that more concentrated hydrofluoric acid is recovered as an overhead product of said stripping, removing also from said stripping a liquid bottom product comprising potassium fluoride and passing same to said distillation, and passing said overhead from said stripping to said alkylation as a catalyst therefor.

2. In the alkylation of isobutane in the presence of a hydrofluoric acid alkylation catalyst in which used hydrofluoric acid is purified by distillation under conditions such that an azeotropic mixture of water and hydrofluoric acid is formed, the method for recovery of more concentrated hydrofluoric acid from said azeotropic mixture which comprises in a first step distilling such an azeotropic mixture in the presence of potassium fluoride dissolved in the kettle liquid, removing from said distillation an overhead product comprising water and a liquid bottom product comprising potassium fluoride and hydrogen fluoride, in a second step stripping said bottom product from said distillation, removing an overhead product from said stripping comprising more concentrated hydrofluoric acid and returning same to said alkylation, and removing also from said stripping a liquid bottom product comprising potassium fluoride and passing same to said distillation.

3. In the alkylation of an alkylatable hydrocarbon in the presence of hydrofluoric acid as an alkylation catalyst in which used hydrofluoric acid is purified by distillation under conditions such that an azeotropic mixture of water and hydrofluoric acid is formed, the method for recovery of more concentrated hydrofluoric acid from said azeotropic mixture which comprises in a first step distilling such an azeotropic mixture in the presence of at least one alkali metal fluoride dissolved in the kettle liquid, removing from said distillation an overhead product comprising water and a liquid bottom product comprising an alkali metal fluoride and hydrogen fluoride, in a second step stripping said bottom product from said distillation under conditions such that more concentrated hydrofluoric acid is recovered as an overhead product of said stripping, passing said overhead product from said stripping to said alkylation, and removing also from said stripping a liquid bottom product comprising an alkali metal fluoride and passing same to said distillation.

4. The process according to claim 3 in which said dissolved alkali metal fluoride comprises a mixture of about 24 mol per cent sodium fluoride and about 76 mol per cent potassium fluoride.

5. A process according to claim 3 in which said dissolved alkali metal fluoride comprises a mixture of about 11 mol per cent sodium fluoride, about 42 mol per cent potassium fluoride and about 47 mol per cent lithium fluoride.

6. In the conversion of hydrocarbons in the presence of hydrofluoric acid in which used hydrofluoric acid is purified by distillation under conditions such that an azeotropic mixture of water and hydrofluoric acid is formed, the method for recovery of more concentrated hydrofluoric acid from said azeotropic mixture which comprises in a first step distilling such an azeotropic mixture in the presence of at least one alkali metal fluoride dissolved in the kettle liquid, removing from said distillation an overhead product comprising water and a liquid bottom product comprising an alkali metal fluoride and hydrogen fluoride, in a second step stripping said bottom product from said distillation under conditions such that more concentrated hydrofluoric acid is recovered as an overhead product of said stripping, and removing also from said stripping a liquid bottom product comprising an alkali metal fluoride and passing same to said distillation.

7. A continuous process for the recovery of more concentrated hydrofluoric acid from an aqueous solution containing at least about 60 weight per cent water which comprises in a first step distilling such a solution in the presence of an alkali metal fluoride dissolved in the kettle liquid, removing from said distillation an overhead product comprising water and a liquid bottom product comprising an alkali metal fluoride and hydrogen fluoride, in a second step stripping said bottom product from said distillation under conditions such that more concentrated hydrofluoric acid is recovered as an overhead product, and removing also from said stripping a liquid bottom product comprising an alkali metal fluoride and passing same to said distillation.

8. A continuous process for the recovery of substantially anhydrous hydrogen fluoride from an azeotropic solution of same with water which comprises in a first step distilling such a liquid azetotropic solution in the presence of potassium fluoride dissolved in the kettle liquid in an amount between about 30 and about 45 mol per cent at a temperature between about 75 and about 300° C. and a corresponding pressure, removing from said distillation an overhead product comprising water and a liquid bottom product comprising potassium fluoride, hydrogen fluoride and water, in a second step stripping said bottom product from said distillation at a temperature between about 300 and about 550° C. and a suitable pressure such that more concentrated hydrofluoric acid is recovered as an overhead product of said stripping, removing a liquid bottom product comprising potassium fluoride and passing same to said first distillation, in a third step distilling said overhead product from said stripping, and recovering from said third distillation step substantially anhydrous hydrogen fluoride as an overhead product.

9. The process according to claim 8 in which the kettle temperature of the first distillation step is between about 150 and about 200° C. and the mol per cent of potassium fluoride in the kettle liquid is between about 35 and about 40.

10. The process according to claim 7 in which said stripping of said bottom product is carried out in the presence of a stripping agent.

11. A process for the recovery of more concentrated hydrofluoric acid from an aqueous solution of the same containing more than 60 weight per cent water which comprises in a first step distilling such a solution in the presence of potassium fluoride dissolved in the kettle liquid, removing from said distillation an overhead product comprising water and a liquid bottom product comprising potassium fluoride and hydrogen fluoride and in a second step stripping said liquid bottom product recovered from said distillation under conditions such that more concentrated hydrofluoric acid is recovered as an overhead product of said stripping.

12. A process for the recovery of more concentrated hydrofluoric acid from an aqueous solution of the same containing more than 60 weight per cent water which comprises in a first step distilling such a solution in the presence of an alkali metal fluoride dissolved in the kettle liquid, removing from said distillation an overhead product comprising water and a liquid bottom product comprising an alkali metal fluoride and hydrogen fluoride and in a second step stripping said liquid bottom product recovered from said distillation under conditions such that more concentrated hydrofluoric acid is recovered as an overhead product of said stripping.

13. In the conversion of hydrocarbons in the presence of hydrofluoric acid in which used hydrofluoric acid is purified by distillation under conditions such that an azeotropic mixture of water and hydrofluoric acid is formed, the method for recovery of more concentrated hydrofluoric acid from said azeotropic mixture which comprise in a first step distilling such as azeotropic mixture in the presence of at least one alkali metal fluoride dissolved in the kettle liquid, removing from said distillation an overhead product comprising water and a liquid bottom product comprising alkali metal fluoride, hydrogen fluoride and water, in a second step partially stripping said bottom product from said distillation under conditions such that substantially all of the water is removed from said bottom product as an overhead product of said stripping, removing a bottom product from said second step comprising hydrofluoric acid and alkali metal fluoride, in a third step stripping said bottom product from said second step under conditions such that substantially anhydrous hydrofluoric acid is recovered as an overhead product of said stripping, and removing also from said third step a liquid bottom product comprising an alkali metal fluoride and passing same to said distillation.

14. A process for resolving aqueous hydrofluoric acid, which comprises subjecting said hydrofluoric acid to distillation in the presence of at least one alkali metal fluoride; withdrawing a first, relatively water-rich overhead product; and subsequently withdrawing a second, relatively hydrofluoric acid-rich overhead product.

15. A process for the resolution of aqueous hydrofluoric acid, which comprises preferentially vaporizing and withdrawing water from a mixture of said aqueous hydrofluoric acid and at least one alkali metal fluoride.

16. The process of claim 15 in which said alkali metal fluoride is a metal fluoride at least as heavy molecularly as potassium fluoride.

MARYAN P. MATUSZAK.

REFERENCES CITED

The following references are of record in the file of this patent:

UNITED STATES PATENTS

| Number | Name | Date |
|---|---|---|
| 2,388,156 | Kelley | Oct. 30, 1945 |
| 2,378,636 | Iverson | June 19, 1945 |
| 2,388,919 | Iverson | Nov. 13, 1945 |
| 2,417,875 | Leonard | Mar. 25, 1947 |

Certificate of Correction

Patent No. 2,428,524.                                                                                                    October 7, 1947.

MARYAN P. MATUSZAK

It is hereby certified that errors appear in the printed specification of the above numbered patent requiring correction as follows: Column 1, line 50, for "percentatge" read *percentage*; column 2, line 34, after the word "liquid" strike out the comma; column 3, line 70, Table II, 5th column thereof, for "Rb.3HF" read *RbF.3HF*; column 8, line 47, after "kettle" insert *material*; column 11, line 74, and column 14, line 26, change the word "as" to *an*; column 13, line 36, for "azetotropic" read *azeotropic*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.*